United States Patent
Venugopal et al.

(10) Patent No.: US 12,068,826 B2
(45) Date of Patent: Aug. 20, 2024

(54) CQI REPORTING FOR MULTI-TCI BASED PDSCH RECEPTION

(71) Applicant: QUALCOMM Incorporated, San Diego, CA (US)

(72) Inventors: Kiran Venugopal, Raritan, NJ (US); Makesh Pravin John Wilson, San Diego, CA (US); Tianyang Bai, Bridgewater, NJ (US); Tao Luo, San Diego, CA (US); Xiaoxia Zhang, San Diego, CA (US); Zhifei Fan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 301 days.

(21) Appl. No.: 16/297,440

(22) Filed: Mar. 8, 2019

(65) Prior Publication Data
US 2019/0334603 A1   Oct. 31, 2019

Related U.S. Application Data

(60) Provisional application No. 62/664,046, filed on Apr. 27, 2018.

(51) Int. Cl.
   *H04B 7/06*  (2006.01)
   *H04B 17/309* (2015.01)
   (Continued)

(52) U.S. Cl.
   CPC ......... *H04B 7/0632* (2013.01); *H04B 17/309* (2015.01); *H04L 1/0003* (2013.01);
   (Continued)

(58) Field of Classification Search
   CPC ... H04B 7/0632; H04B 17/309; H04L 1/0026; H04L 5/0057; H04L 5/0048; H04W 72/0413; H04W 24/10
   See application file for complete search history.

(56) References Cited

U.S. PATENT DOCUMENTS

| | | | |
|---|---|---|---|
| 2009/0154588 A1* | 6/2009 | Chen | H04B 17/24 375/267 |
| 2012/0244903 A1* | 9/2012 | Fong | H04L 43/16 455/517 |

(Continued)

FOREIGN PATENT DOCUMENTS

| | | |
|---|---|---|
| CN | 1860815 A | 11/2006 |
| CN | 104956606 A | 9/2015 |
| CN | 107645324 A | 1/2018 |

OTHER PUBLICATIONS

ZTE, "Remaining details on beam management", 7.1.2.2.3, R1-1801581, Feb. 26-Mar. 2, 2018, 3GPP TSG RAN WG1 Meeting #92. (Year: 2018).*

(Continued)

*Primary Examiner* — Derrick W Ferris
*Assistant Examiner* — Sumitra Ganguly
(74) *Attorney, Agent, or Firm* — Arent Fox, LLP

(57) ABSTRACT

The present disclosure relates to transmitting and receiving improved quality reports using different transmission states. A base station may transmit to a user equipment (UE) a channel comprising multiple beams, wherein the beams include different Transmission Configuration Indicator (TCI) states. The UE can then perform beam quality measurements for the multiple beams. The beam quality measurements can include different channel quality indicator (CQI) measurements and can be performed using the same or different spatial filters. The UE can then determine a combined beam quality report for the different beams and transmit the report to the base station. The beam quality report can also comprise a comparison of, the difference between, or the average of, the different CQI measurements. The UE can also receive a configuration of filtering coeffi- (Continued)

cients from the base station, wherein the beam quality report comprises filtered CQI information.

20 Claims, 11 Drawing Sheets

(51) Int. Cl.
| | |
|---|---|
| *H04L 1/00* | (2006.01) |
| *H04L 5/00* | (2006.01) |
| *H04W 24/10* | (2009.01) |
| *H04W 72/21* | (2023.01) |
| *H04B 7/0408* | (2017.01) |

(52) U.S. Cl.
CPC .......... *H04L 1/0026* (2013.01); *H04L 5/0048* (2013.01); *H04L 5/0057* (2013.01); *H04W 24/10* (2013.01); *H04W 72/21* (2023.01); *H04B 7/0408* (2013.01)

(56) References Cited

U.S. PATENT DOCUMENTS

| | | | | |
|---|---|---|---|---|
| 2014/0295865 | A1* | 10/2014 | Fantaye | H04W 72/54 455/450 |
| 2016/0142189 | A1* | 5/2016 | Shin | H04B 7/0626 370/329 |
| 2017/0257184 | A1* | 9/2017 | Stirling-Gallacher | H04L 1/0026 |
| 2017/0324459 | A1* | 11/2017 | Koskela | H04B 7/0617 |
| 2018/0227035 | A1* | 8/2018 | Cheng | H04B 7/0626 |
| 2018/0278310 | A1* | 9/2018 | Lee | H04B 7/0632 |
| 2018/0279284 | A1* | 9/2018 | Wang | H04W 24/10 |
| 2019/0074996 | A1* | 3/2019 | Li | H04L 25/0222 |
| 2019/0097781 | A1* | 3/2019 | Tang | H04L 1/00 |
| 2019/0123794 | A1* | 4/2019 | Onggosanusi | H04B 7/065 |
| 2019/0141693 | A1* | 5/2019 | Guo | H04L 5/0044 |
| 2019/0253904 | A1* | 8/2019 | Tsai | H04W 16/14 |

OTHER PUBLICATIONS

International Search Report and Written Opinion—PCT/US2019/021675—ISA/EPO—Jun. 7, 2019.
QUALCOMM: "Summary on Beam Management Offline", 3GPP Draft; R1-1716758, Summary of Beam Mgmt Contribution V7, 3rd Generation Partnership Project (3GPP), Mobile Competence Centre, 650, Route Des Lucioles ; F-06921 Sophia-Antipolis Cedex; France, vol. RAN WG1, No. Nagoya, Japan; Sep. 18, 2017-Sep. 21, 2017, Sep. 25, 2017 (Sep. 25, 2017) XP051353998, 23 Pages, Retrieved from the Internet: URL:http://www.3gpp.org/ftp/tsg_ran/WG1_RL1/TSGR1_AH/NR_AH_1709/Docs/ [retrieved on-Sep. 25, 2017], p. 3-p. 7, p. 15-p. 16.
Spreadtrum Communications: "Beam Measurement, Report, and Indication", 3GPP Draft; R1-1717743—Beam Measurement, Report, and Indication Final, 3rd Generation Partnership Project (3GPP), Mobile Competence Centre, 650, Route Des Lucioles. F-06921 Sophia-Antipolis Cedex, vol. RAN WG1, No. Prague, CZ; Oct. 9, 2017-Oct. 13, 2017, Oct. 8, 2017 (Oct. 8, 2017), XP051340928, 5 Pages, Retrieved from the Internet: URL:http://www.3gpp.org/ftp/Meetings_3GPP_SYNC/RAN1/Docs/ [retrieved on Oct. 8, 2017].
ZTE et al., "Discussion on Beam Management", 3GPP Draft; R1-1717424 Discussion on Beam Management, 3rd Generation Partnership Project (3GPP), Mobile Competence Centre ; 650, Route Des Lucioles; F-06921 Sophia-Antipolis Cedex ; France, vol. RAN WG1, No. Prague, Czechia; Oct. 9, 2017-Oct. 13, 2017, Oct. 8, 2017 (Oct. 8, 2017), XP051340613, 12 Pages, Retrieved from the Internet: URL:http://www.3gpp.org/ftp/Meetings_3GPP_SYNC/RAN1/Docs/ [retrieved on Oct. 8, 2017], Sections 1, 2.1, 3.1.,4, figure 2.
ZTE et al., "Remaining Details on Beam Management", 3GPP Draft; R1-1801581 Remaining Details on Beam Management, 3rd Generation Partnership Project (3GPP), Mobile Competence Centre ; 650, Route Des Lucioles ; F-06921 Sophia-Antipolis Cedex; France, vol. RAN WG1, No. Athens, Greece; Feb. 26, 2018-Mar. 2, 2018, Feb. 16, 2018 (Feb. 16, 2018), XP051396949, 6 Pages, Retrieved from the Internet: URL:http://www.3gpp.org/ftp/tsg%5Fran/WG1%5FRL1/TSGR1%5F92/Docs/ [retrieved on Feb. 16, 2018], Sections 3 and 4.

* cited by examiner

CQI REPORTING FOR MULTI-TCI BASED PDSCH RECEPTION

CROSS REFERENCE TO RELATED APPLICATION(S)

This application claims the benefit of U.S. Provisional Application Ser. No. 62/664,046, entitled "CQI REPORTING FOR MULTI-TCI BASED PDSCH RECEPTION" and filed on Apr. 27, 2018, which is expressly incorporated by reference herein in its entirety.

BACKGROUND

Technical Field

The present disclosure relates generally to communication systems, and more particularly, to methods and devices for transmitting and/or receiving improved quality reports.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communications, base stations and UEs send different communication channels between one another to facilitate communication. In order to improve the reliability of these communications, different quality reports can be determined and transmitted between the base station and UE. Some channels can include multiple transmission states, such as a Transmission Configuration Indicator (TCI) state, in order to improve the overall throughput of the communication. When certain channels, such as a downlink data channel or physical downlink shared channel (PDSCH), include multiple TCI states, it can be beneficial to perform a quality measurement and determine a corresponding quality report. By doing so, the reliability of communication between the base station and the UE can be improved.

The present disclosure enables transmission and receipt of improved quality reports using different transmission or TCI states. A base station may transmit, to a UE, a channel comprising multiple beams, e.g., including at least a first beam and a second beam. The first beam and the second beam can include a corresponding first TCI state and a second TCI state that are different from one another. The UE can then perform beam quality measurements for the multiple beams, wherein the beam quality measurements can include different channel quality indicator (CQI) measurements. The beam quality measurements can also be performed using the same spatial filter or different spatial filters for each measurement. The UE can determine a combined beam quality report for the different beams and then transmit the beam quality report to the base station. The beam quality report can also comprise a comparison of the different CQI measurements. The comparison in the beam quality report can comprise a variety of different calculations, including a difference or delta, an average, a deviation, as well as any other analysis of the different CQI measurements. The aspects presented herein improve the ability of the UE and the base station to communicate using multiple beams and/or multiple TCI states.

The base station can configure filtering coefficients for the UE, wherein the combined beam quality report comprises filtered CQI information for the first beam and the second beam. Additionally, the base station can configure a Channel State Information Reference Signal (CSI-RS) mode for the combined beam quality report from the UE, wherein the combined beam quality report received from the UE is based on the CSI-RS mode. The base station can also schedule a first slot or a first mini-slot based on a first modulation and coding scheme (MCS) prior to receiving the combined beam quality report, as well as schedule a second slot or a second mini-slot based on a second MCS, wherein the second MCS is based on the combined beam quality report. Moreover, the combined beam quality report can comprise a comparison of the different CQI measurements, such as a first CQI measurement for the first beam and a second CQI measurement for the second beam. The second MCS can comprise a reduced MCS when the comparison of the first CQI measurement and the second CQI measurement is below a certain threshold.

In an aspect of the disclosure, a method, a computer-readable medium, and an apparatus are provided for wireless communication at a UE for transmitting a beam quality report. The apparatus performs a first beam quality measurement for a first beam associated with a first TCI state, and performs a second beam quality measurement for a second beam associated with a second TCI state. The first TCI state can be different than the second TCI state. The, the apparatus determines a combined beam quality report for at least the first beam and the second beam. The apparatus can then transmit the combined beam quality report to a base station.

In another aspect of the disclosure, a method, a computer-readable medium, and an apparatus are provided for wireless communication at a base station for receiving a beam quality report. The apparatus transmits at least one channel to a UE comprising two or more beams. The two or more beams comprise a first beam associated with a first TCI state and a second beam associated with a second TCI state, wherein the first TCI state is different than the second TCI state. The apparatus then receives a combined beam quality report from the UE, wherein the combined beam quality report is based on a combination of a first beam quality measurement performed by the UE on the first beam and a second beam quality measurement performed by the UE on the second beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
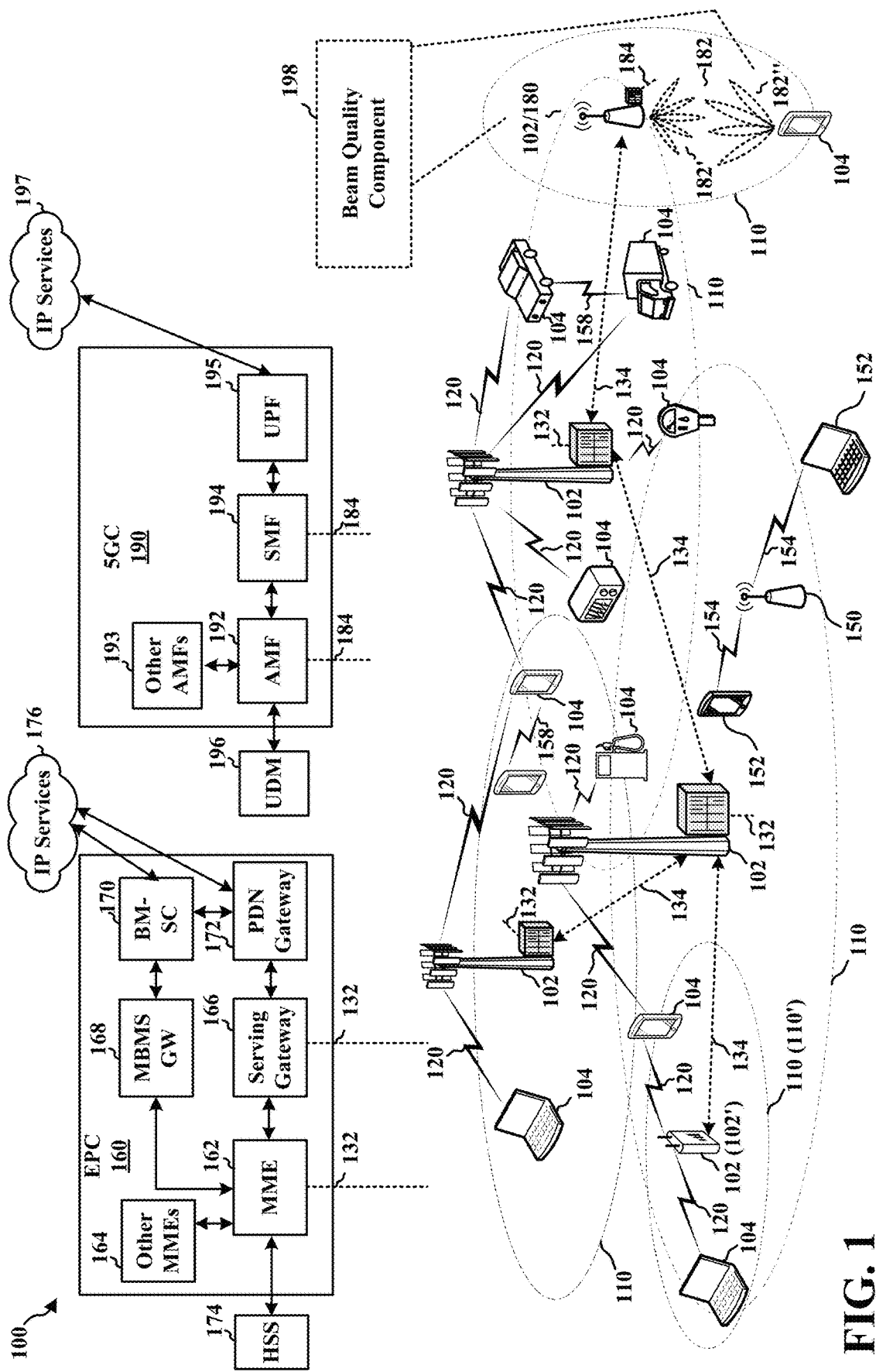
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 182 and/or base station 180 may include a beam quality component 198 configured to perform beam quality measurements and transmit a combined beam quality report, as described herein. For example, beam quality component 198 may be configured to transmit a channel comprising multiple beams, wherein the beams include different TCI states. Beam quality component 198 can also be configured to perform beam quality measurements for each of the multiple beams. The beam quality measurements can include different CQI measurements and can be performed using the same or different spatial filters. Also, beam quality component 198 can be configured to determine a combined beam quality report for the multiple beams and transmit the report to the base station. Beam quality component 198 can also comprise a comparison of the different CQI measurements. The comparison in the beam quality report can comprise a variety of different calculations, including a difference or delta, an average, a deviation, as well as any other analysis of the different CQI measurements. Beam quality component 198 can also be configured to receive a configuration of filtering coefficients from the base station, wherein the beam quality report comprises filtered CQI information.

Figure 2:
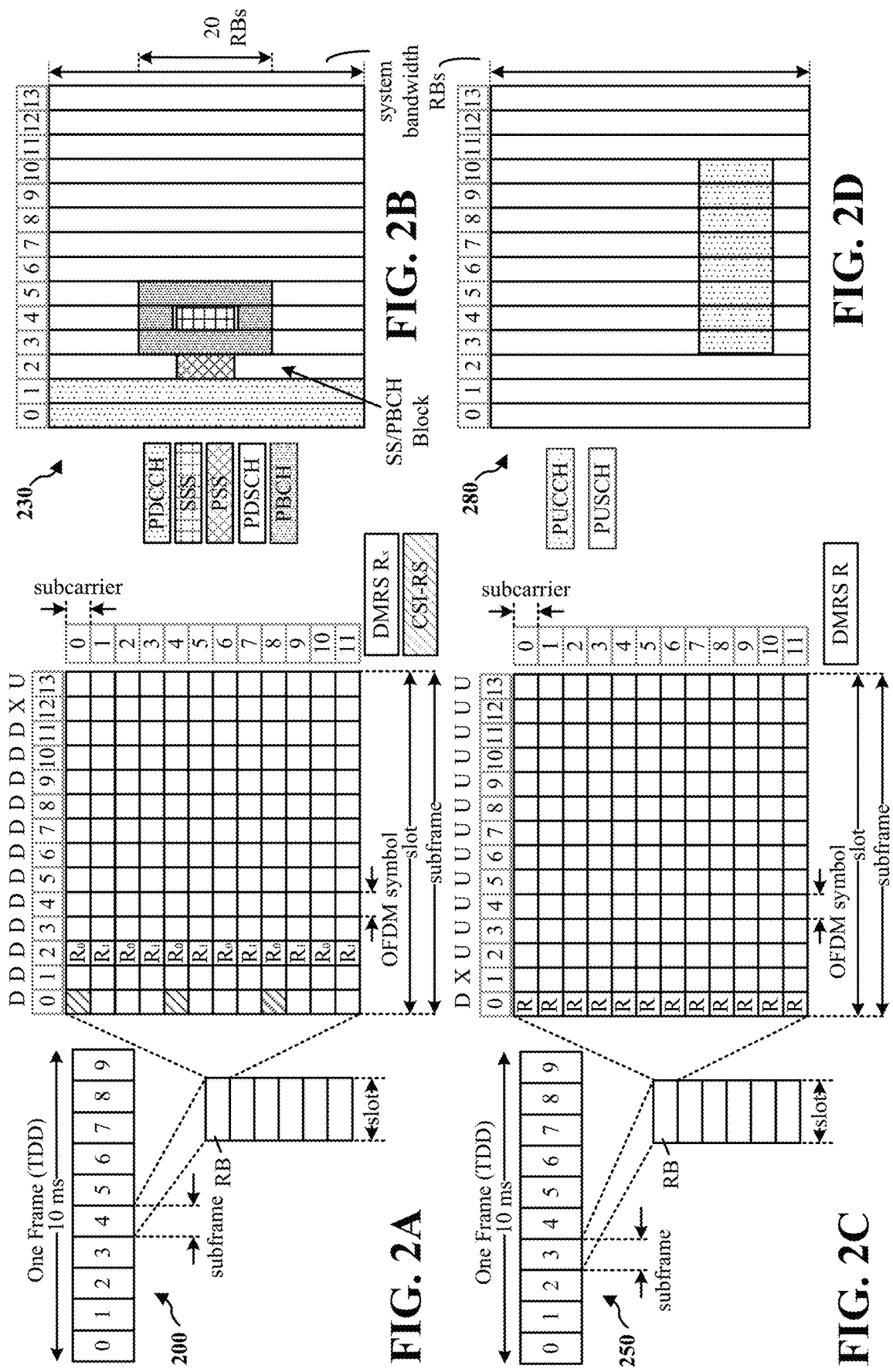
FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (B S R), a power headroom report (PHR), and/or UCI.

Figure 3:
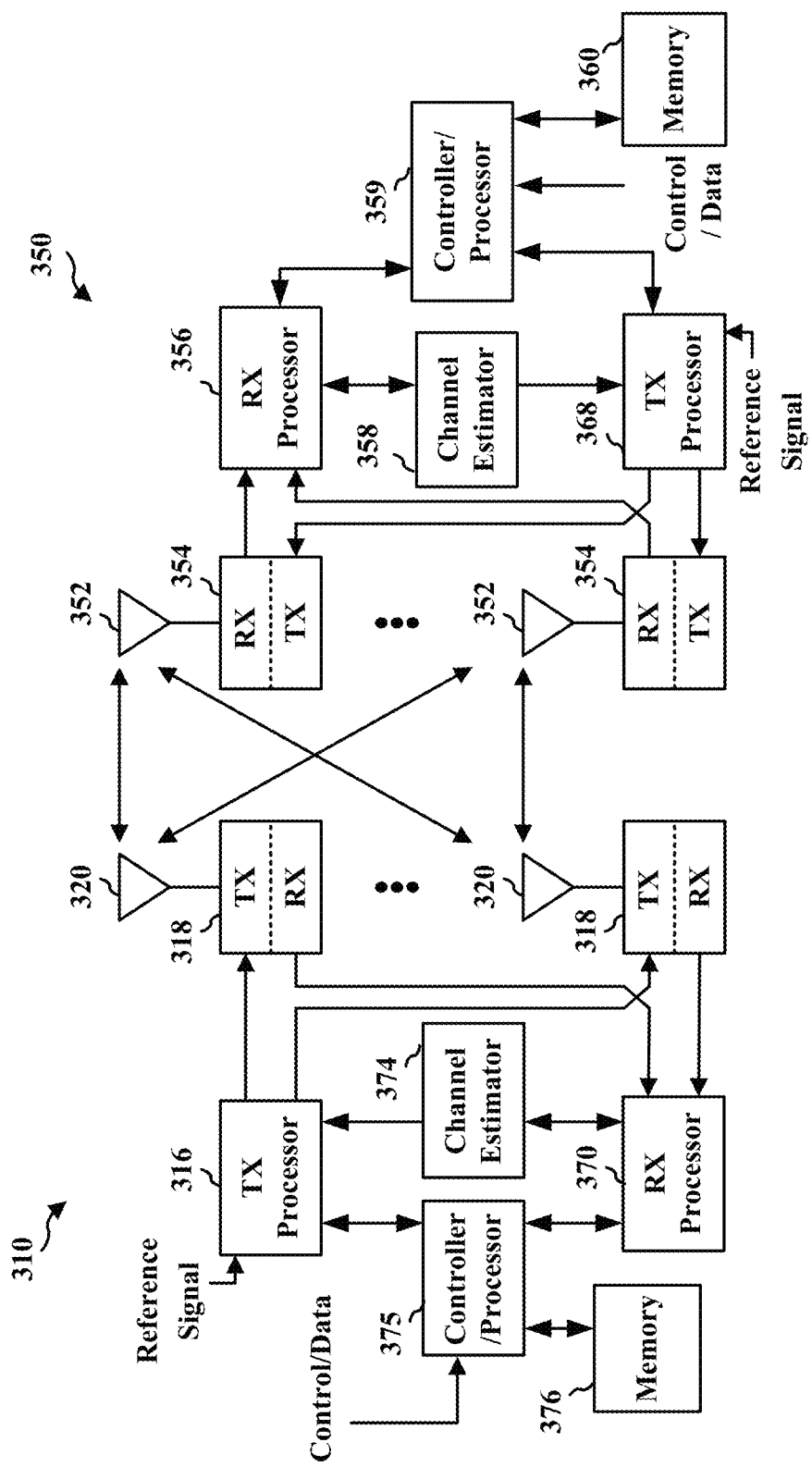
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
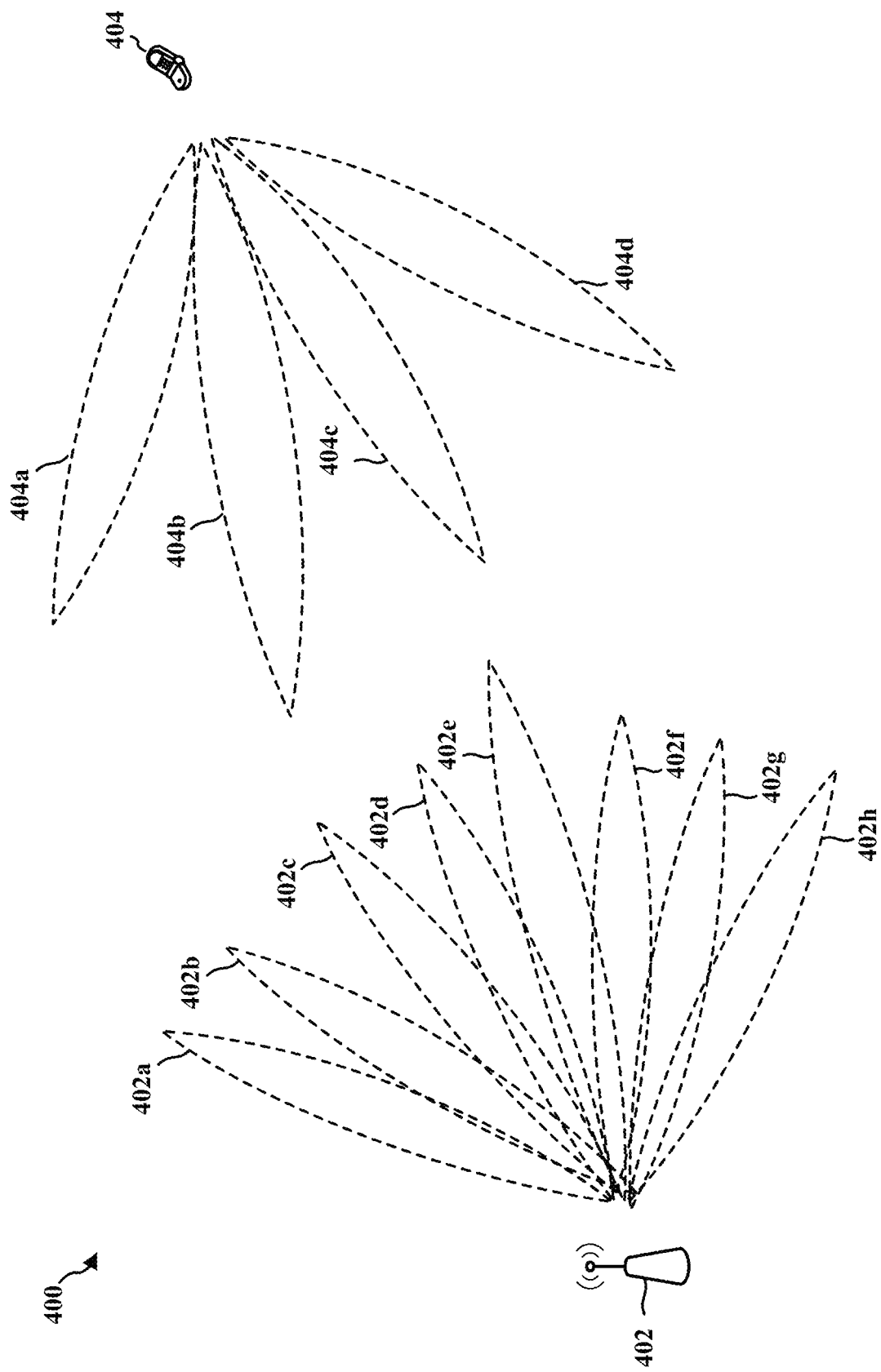
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Certain aspects of operations or communications between base stations (e.g., gNBs) and UEs, for example, when operating at mmW frequencies, are more susceptible to experiencing communication outages. For instance, some of these communication outages can be due to beam blockages. In order to combat these potential communication outages, the communication system can operate using more than one beam, which can be referred to as a multi-beam operation. By using a multi-beam operation, the communication system can promote transmit diversity, as well as reduce the potential impact of beam blockages. Indeed, by increasing the number of beams used during communication, when there is potential for blockage of one beam, then the other beams can continue to operate unhindered. In order to implement such a multi-beam operation, the base station and UEs can transmit or receive channels with multiple transmission states.

In some aspects of the present disclosure, when a downlink data channel, e.g., a PDSCH, is transmitted between a base station and a UE, the channel can include multiple beams with multiple TCI states. In some aspects, TCI states can be used for indicating, e.g., over DCI, a transmission configuration which includes quasi co-location (QCL) relationships between the DL RSs in one RS set and/or the PDSCH demodulation reference signal (DMRS) ports. Also, TCI states can be used to refer to different beam selections. For example, a Control Resource Set (CORESET), which can be associated with a beam, can also be associated with a TCI state. In some aspects, within the PDSCH, the downlink data can be transmitted over beams having multiple TCI states. A PDSCH with multiple TCI states can be beneficial because it may improve the overall throughput and the multi-link operation. The present disclosure can provide methods and apparatuses for CQI reporting for multi-TCI based PDSCH reception. Moreover, the present disclosure can provide for multi-beam and multi-TCI state operation without any significant drawbacks, e.g., without increasing the downlink control information (DCI) payload size. However, in some aspects, for a multi-beam PDSCH with multiple TCI states, the DCI payload size may be increased in order to specify the CQI. In some instances, the multiple beams and TCI states configuration may result in an increase in overhead cost; however, in other instances, this configuration can decrease overhead.

Channel Signal Information (CSI) reports can be sent from a UE to a base station, or vice versa. CSI includes several types of information that the UE can send to the base station for scaling and downlink transmission. For example, this can include a CQI, Precoding Matrix Indicator (PMI), CSI-RS Resource Indicator (CRI), Length Indicator (LI), Rank Indicator (RI), and/or Reference Signal Received Power (RSRP), e.g., Layer 1 RSRP (L1-RSRP). CQI reports can be sent by a UE to a base station (e.g., gNB) based on a CQI-table to determine a modulation scheme or MCS for the downlink data channel (e.g., PDSCH), for example, in a given TCI state. Specifically, the base station can implement an MCS for the PDSCH. Moreover, each index of the CQI report can correspond to a specific MCS. UE feedback can be based on receiving information, wherein a transport block error probability or block error rate (BLER) does not exceed a certain threshold.

The MCS for certain channel (e.g., PDSCH) transmissions in the CSI reference resource is indicated via the DCI. In some aspects, this MCS can also correspond to a CQI index. This CQI index can be used by the base station to indicate the DCI in the downlink, as well as to indicate which MCS is used. A combination of the MCS and transport block size can correspond to a CQI index if several factors are present. For instance, the combination could be signaled for transmission on the PDSCH in the CSI reference resource according to a transport block size determination. Also, the MCS and transport block size combination can correspond to a CQI index if the MCS is actually indicated by the CQI index. Finally, this combination can correspond to a CQI index if the MCS and transport block size, when applied to the reference resource, result in an effective channel code rate. This effective channel code rate should be the closest code rate to the code rate actually indicated by the CQI index. In some instances, when more than one MCS and transport block size combination result in effective channel code rates that are equally close to the code rate indicated by the CQI index, then the combination with the smallest transport block size can be relevant.

A PDSCH transmitted with multiple TCI states may lead to an undesirable increase in DCI payload sizes.

The present disclosure enables the benefits of multiple TCI states while addressing the potential increase in DCI payload. Aspects presented herein provide for reporting a combined CQI, such as a differential CQI across multiple beams for multiple TCI states. More specifically, a UE and a base station can transmit or receive beam quality reports covering multiple beams and multiple TCI states within a certain channel, e.g., a downlink data channel or PDSCH, wherein the reports are calculated using the feedback differential or delta CQI/RSRP. The beam quality report can include a combination of the different CQI measurements for the multiple beams. In some aspects, the beam quality report can comprise a comparison of the CQI measurements, e.g., a delta between the CQI/RSRP measurements. In other aspects, the beam quality report can comprise the average of the CQI measurements. In yet other aspects, the beam quality report can comprise both a differential and an average of the CQI measurements. As mentioned above, beam quality reports according to the present disclosure can help to improve the reliability of wireless communications, as well as a number of different benefits, including but not limited to improved coverage areas.

Prior to receiving the combined beam quality report, the base station can schedule an MCS on a slot or mini-slot. For instance, a first slot or first mini-slot can be scheduled based on a first MCS. Also, a second slot or a second mini-slot can be scheduled based on a second MCS, wherein the second MCS is based on the combined beam quality report. The second MCS may be determined by both the base station and the UE based on the combined channel quality measurement reported by the UE. The base station can also derive the subsequent modulation order determined by the differential CQI/RSRP. This may reduce DCI length. For example, the base station may transmit using 64 QAM on a best beam, then may transmit using 16 QAM on a weaker beam than the best beam. The base station may further transmit using QPSK on a weaker/weakest beam. For example, a rule may be specified that indicates for the MCS to be reduced in a defined manner when a delta CQI/RSRP is less than a threshold.

Additionally, the base station can configure the CSI-RS mode for avoiding a multiple MCS specification. It is also noted that different CSI-RS resources can have a different QCL, as well as request for reports from the UE.

As noted above, the UE can also report the average CQI across the multiple beams, as another way of indicating a combined channel quality measurement.

The base station can also configure filtering coefficients for each of the multiple beams. In these instances, the UE can report the filtered CQI for the beams using the filtering coefficients configured by the base station.

The aforementioned measuring and reporting between base stations and UEs can be particularly applicable to operations or communications at mmW frequencies and/or near mmW frequencies. However, the novel and inventive features herein are applicable to wireless operations or communications at any number of different frequencies, including but not limited to frequencies used in 5G NR, 4G LTE, Wi-Fi, or any other telecommunications standard.

Figure 5:
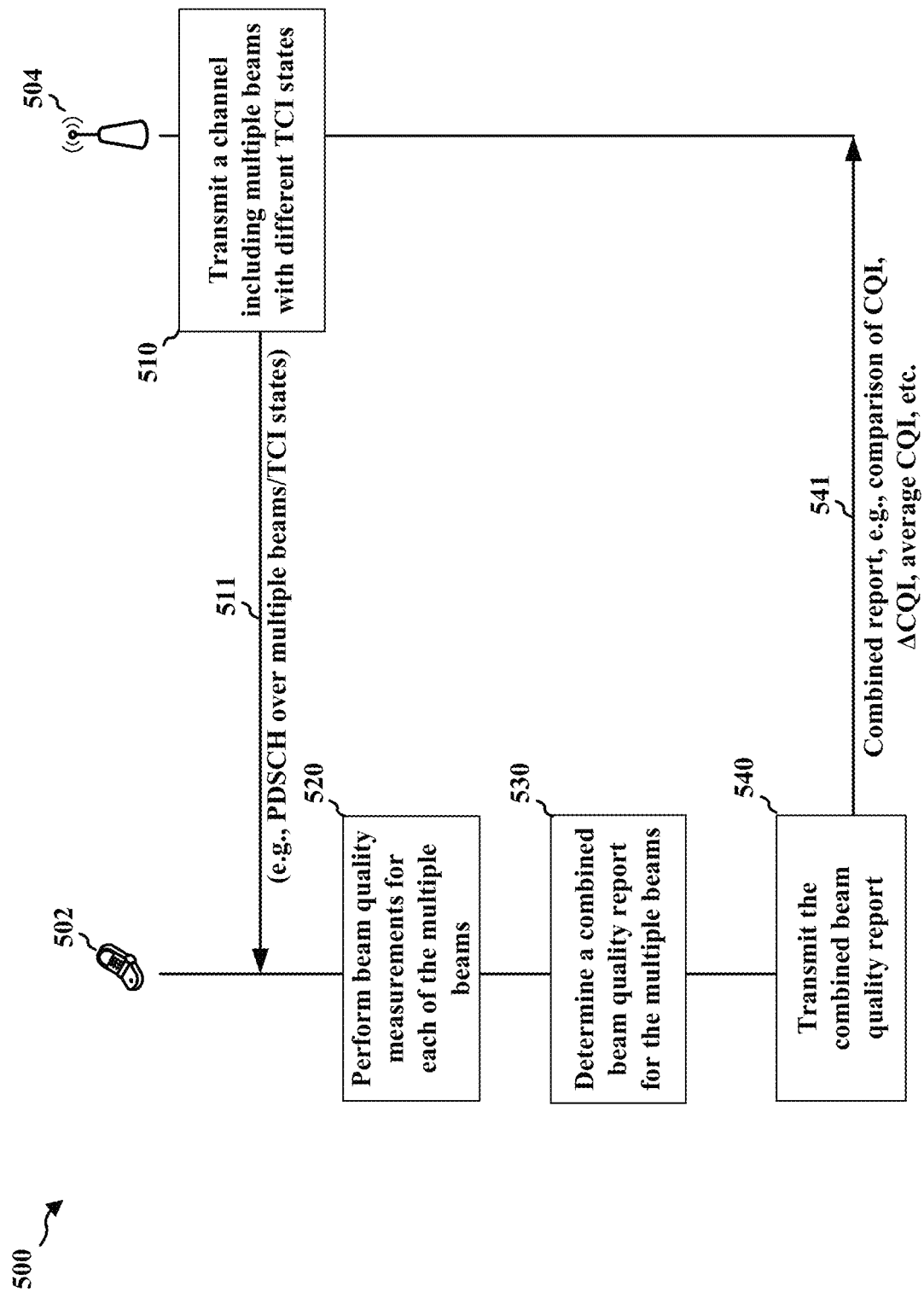
FIG. 5 is a diagram illustrating transmissions between a base station and a UE including a beam quality report.

FIG. 5 is a communication flow diagram 500 including transmissions between base station 504 and UE 502 using beams, such as described in connection with FIGS. 1 and 4. For instance, base station 504 can transmit 510 a channel 511, e.g., PDSCH, comprising multiple beams to UE 502, e.g., using a first beam and a second beam (not shown). The first beam and second beam may each correspond to one of beams 182' or beams 402a-402h. The first beam and the second beam can have a corresponding first transmission or TCI state and a corresponding second transmission or TCI state, respectively. In some aspects, the first TCI state and the second TCI state are different from one another. UE 502 can be configured to perform 520 beam quality measurements for the multiple beams. For example, UE 502 can perform a first beam quality measurement for a first beam associated with the first TCI state, and perform a second beam quality measurement for a second beam associated with the second TCI state. In some aspects, the first TCI state is different than the second TCI state. TCI states for different beams can be the same or different from one another. Additionally, each beam quality measurement can include a different CQI measurement. For example, the first beam quality measurement can comprise a first CQI measurement and the second beam quality measurement can comprise a second CQI measurement.

UE 502 can also determine 530 a beam quality report for at least the first beam and the second beam. The beam quality report can be a combination of the multiple beams, e.g., the first beam and the second beam, such that it can be referred to as a combined beam quality report. Once the beam quality report is determined, UE 502 can transmit 540 the combined beam quality report 541 to base station 504. However, the beam quality report can be determined by and/or transmitted from either a UE or a base station. Likewise, either a UE or a base station can receive the beam quality report from a base station or UE.

In addition, the beam quality measurements can be performed using a spatial filter. In some aspects according to the present disclosure, each beam quality measurement can use the same spatial filter, while in other aspects, different spatial filters can be used for each beam quality measurement. The beam quality measurement may include a delta CSI based on the separate spatial filters. The determination may be made based on transmitted Synchronization Signal Block (SSB)/ CSI-RS in Time Division Multiplexing (TDM) occasions. In other aspects, this determination can be made implicitly based on the UE architecture, such as hybrid or fully connected architecture, power saving considerations, etc.

The base station can use the information and reports from the UE to transmit the PDSCH over multiple beams and TCI states, as well as in a Frequency Division Multiplexing (FDM) or Time Division Multiplexing (TDM) manner. In some aspects, the MCS for FDM may be based on CSI using the same spatial domain filter. In other aspects, the MCS for TDM may be based on CSI using separate spatial domain filters.

Moreover, the beam quality report can calculate or determine a comparison of each beam quality measurement. For example, the comparison in the beam quality report can comprises a difference or delta, an average, a deviation, as well as any other calculation between a first CQI measurement for a first beam and a second CQI measurement for a second beam. The difference or delta calculation can be quantized using discrete values, rounding, truncation, etc. In other aspects, the beam quality report can comprise the average of the different beam quality measurements. For instance, the combined beam quality report can comprise an average of the first CQI measurement for a first beam and the second CQI measurement for a second beam. However, the beam quality report can perform the different CQI measurements in a number of different manners, including calculating both the difference between and the average of the different CQI measurements.

As mentioned above, the base station can configure filtering coefficients for the UE, wherein the combined beam quality report comprises filtered CQI information for the first beam and the second beam. Additionally, the base station can configure a Channel State Information Reference Signal (CSI-RS) mode for the combined beam quality report from the UE, wherein the combined beam quality report received from the UE is based on the CSI-RS mode. The base station can also schedule a first slot or a first mini-slot based on a first modulation and coding scheme (MCS) prior to receiving the combined beam quality report, as well as schedule a second slot or a second mini-slot based on a second MCS, wherein the second MCS is based on the combined beam quality report. Moreover, the combined beam quality report can comprise a comparison of the different CQI measurements, such as a first CQI measurement for the first beam and a second CQI measurement for the second beam. The second MCS can comprise a reduced MCS when the comparison of the first CQI measurement and the second CQI measurement is below a certain threshold.

Figure 6:
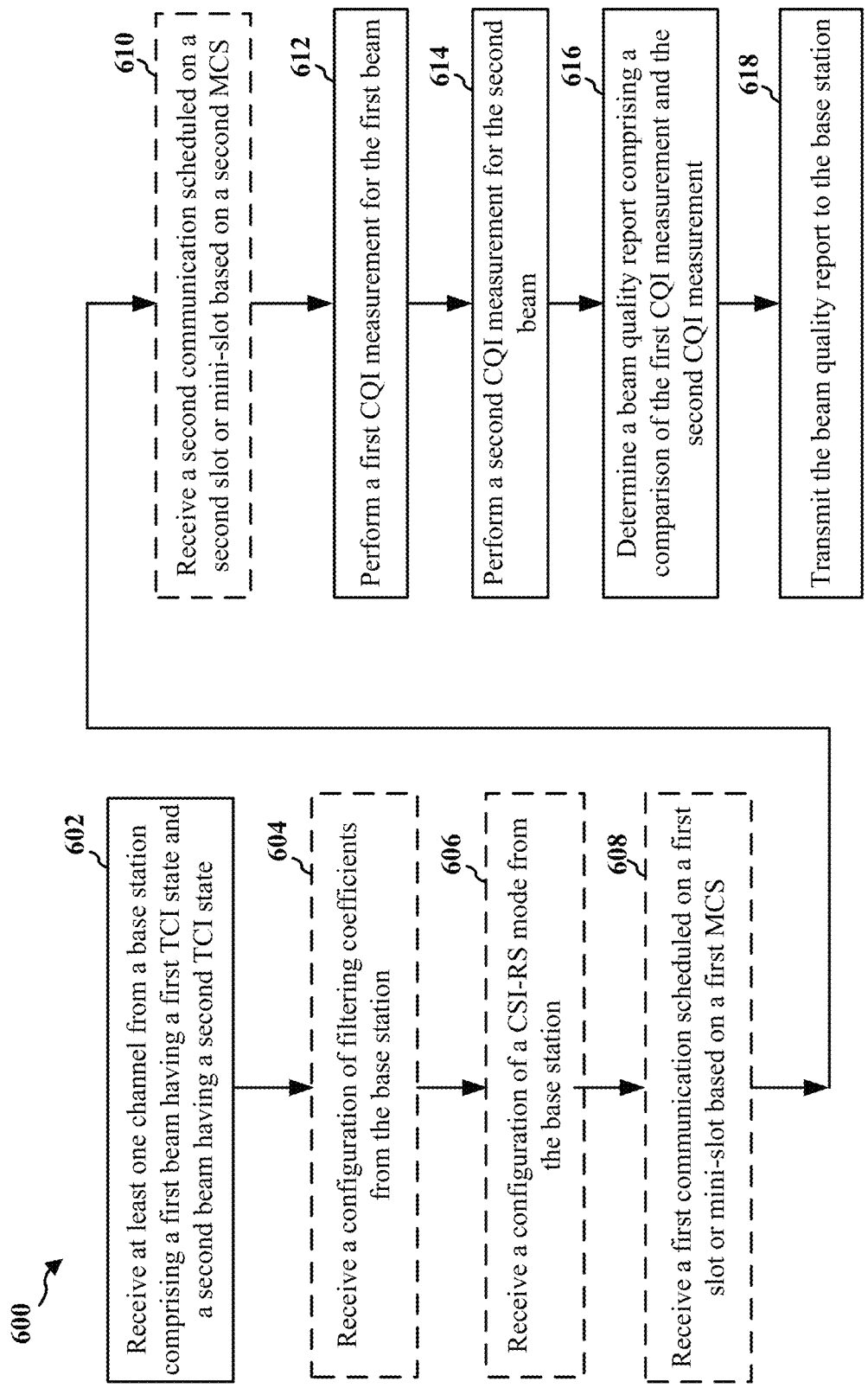
FIG. 6 is a flowchart of a method of wireless communication.

FIG. 6 is a flowchart 600 of a method of wireless communication. The method may be performed by a UE (e.g., UE 104, 182, 350, 404, 502, the apparatus 702) communicating with a base station (e.g., base station 102, 180, 310, 402, 504, apparatus 1002). The communication may comprise, e.g., mmW communication, and may include beamformed transmission and/or beamformed reception. Optional aspects are illustrated with a dashed line. The method described herein can provide a number of benefits, such as improving the ability of the UE and the base station to communicate using multiple beams and/or multiple TCI states.

The UE can perform a first beam quality measurement for a first beam associated with a first TCI state. The first beam may correspond to one of beams 182' or beams 402a-402h. As mentioned herein, the first beam quality measurement can comprise any of several types of measurements, including but not limited to a CQI measurement. The UE can also perform a second beam quality measurement for a second beam associated with a second TCI state. The UE can determine a beam quality report for at least the first beam and the second beam.

In some aspects, the beam quality report can be determined by combining the first beam and the second beam. Accordingly, the beam quality report can be referred to as a combined beam quality report. The beam quality report can also comprise calculations regarding the beam quality measurements. For instance, the beam quality report can comprise a comparison of (e.g., differential or delta, an average, a deviation, etc.) the first beam quality measurement and the second beam quality measurement. Moreover, the beam quality report can comprise an average of the first beam quality measurement and the second beam quality measurement. The aforementioned beam quality measuring and reporting can be applicable a number of different frequencies, and particularly to operations or communications at or near mmW frequencies. Thus, the UE may perform the first beam quality measurement for the first beam using mmW based communication.

At 602, the UE may receive at least one channel from a base station. This channel can comprise multiple beams with multiple TCI states. The multiple beams may each correspond to one of beams 182' or beams 402a-402h, for example. The channel may comprise a data channel, e.g., PDSCH 511, transmitted with multiple TCI states. For instance, the channel can include a first beam associated with a first TCI state and a second beam associated with a second TCI state. In some aspects, the first TCI state is different from the second TCI state, while in other aspects, the first TCI state can be the same as the second TCI state. It is understood that any number of TCI states can be used. In another example, the second beam may be the same as the first beam, yet with a different TCI state. Indeed, the present disclosure can provide for any number of different beams.

At 604, the UE may receive a configuration of filtering coefficients from the base station. The beam quality measurements from 612, 614 may be filtered based on the filtering coefficients such that the beam quality report can comprise filtered beam quality measurement information. In some aspects, a base station may request for a filtered version, e.g., a linear combination, of multiple reports in order to determine the channel quality. For example, the base station may determine an average CQI across the beams. By doing so, the base station can reduce the overhead in reporting while conveying the requested information.

At 606, the UE may receive a configuration of a CSI-RS mode for the combined beam quality report from the base station. Further, the combined beam quality report can be based on the CSI-RS mode. For example, different CSI-RS resources may have different QCL characteristics and may be configured for different types of reports. Thus, by receiving a configuration for a particular CSI-RS mode, the UE may determine that the base station requests a certain type of report from the UE.

At 608, the UE may receive a first communication scheduled on a first slot or mini-slot based on a first MCS. The UE can receive this communication prior to transmitting the combined beam quality report.

At 610, the UE may receive a second communication scheduled on a second slot or mini-slot based on a second MCS. The second MCS can be based on the combined beam quality report. Thus, an MCS for a subsequent slot/mini-slot may be determined by the UE, as well as by the base station, based on a measurement during the first slot/mini-slot. The measurement may be a delta CQI and/or a delta RSRP measured during the slot/mini-slot. For example, the UE may use a rule indicating that the MCS is reduced by a certain amount if the delta CQI/RSRP is less than a threshold.

Additionally, the UE may be configured to measure two or more different beams. As mentioned previously, these different beams can comprise different TCI states.

At 612, the UE performs a first beam quality measurement for the first beam associated with the first TCI state. The beam quality measurement may comprise a CQI measurement. Each beam can have several types of beam quality measurements performed on it, including but not limited to a CQI measurement. Other measurements may include RSRP measurements, RSSI measurements, or other CSI measurements.

At 614, the UE performs a second beam quality measurement for the second beam associated with the second TCI state, wherein the second TCI state is different from the first TCI state. Thus, at each of 612, 614, the UE may perform a beam quality measurement, similar to CQI, e.g., RSRP, RSSI, or other CSI measurement.

In some aspects, the UE can measure the different beams at 612, 614 using the same spatial domain filter. In other aspects, the UE can perform the measurement of the different beams at 612, 614 using multiple, different spatial domain filters. The spatial filter can be used to perform a number of different measurements, including the beam quality measurements. These spatial domain filter measurements can be performed simultaneously or at different times. The UE may be asked to make the different measurements using the same receive or transmit beam. When using different beam groupings, the UE can measure and report the RSRP value of the different beams.

In addition to reporting measurements of the beams using the same spatial filter, the UE may be configured to report a differential or delta CSI that reflects measurements based on separate spatial filters. In some aspects, this determination may be made on transmitted Synchronization Signal Block (SSB)/CSI-RS in Time Division Multiplexing (TDM) occasions. In other aspects, this determination can be made implicitly based on the UE architecture, such as hybrid or fully connected architecture, power saving considerations, etc. This can also be based on the UE using one sub-array or multiple sub-arrays to measure the different beams.

At 616, the UE determines a combined beam quality report for at least the first beam and the second beam. The combined beam quality report may comprise a comparison of the first beam quality measurement at 612 and the second beam quality measurement at 614. For example, the combined report may comprise a delta CQI between the different CQI measurements measured at 612, 614. As mentioned herein, this can involve calculating the differential or delta CQI across the multiple beams having different TCI states. For instance, the UE can calculate a comparison of the first CQI measurement of the first beam and the second CQI measurement of the second beam. In determining the beam quality report, the UE can combine the calculations into the delta. In another example, the combined beam quality report may comprise an average beam quality measurement, e.g., CQI, across the different beams having different TCI states. For example, the UE can calculate an average of the first CQI measurement of the first beam and the second CQI measurement of the second beam. This average calculation can potentially reduce the uplink overhead. However, the average might not be calculated when the beam RSRPs are too different.

Finally, at 618, the UE can transmit the combined beam quality report to a base station. The base station can use the beam quality report from the UE in a variety of manners, e.g., use the report to transmit the PDSCH over multiple beams and TCI states, as well as in a FDM or TDM manner. As such, the combined beam quality report can improve the ability of the UE and the base station to communicate using multiple beams and/or multiple TCI states.

Figure 7:
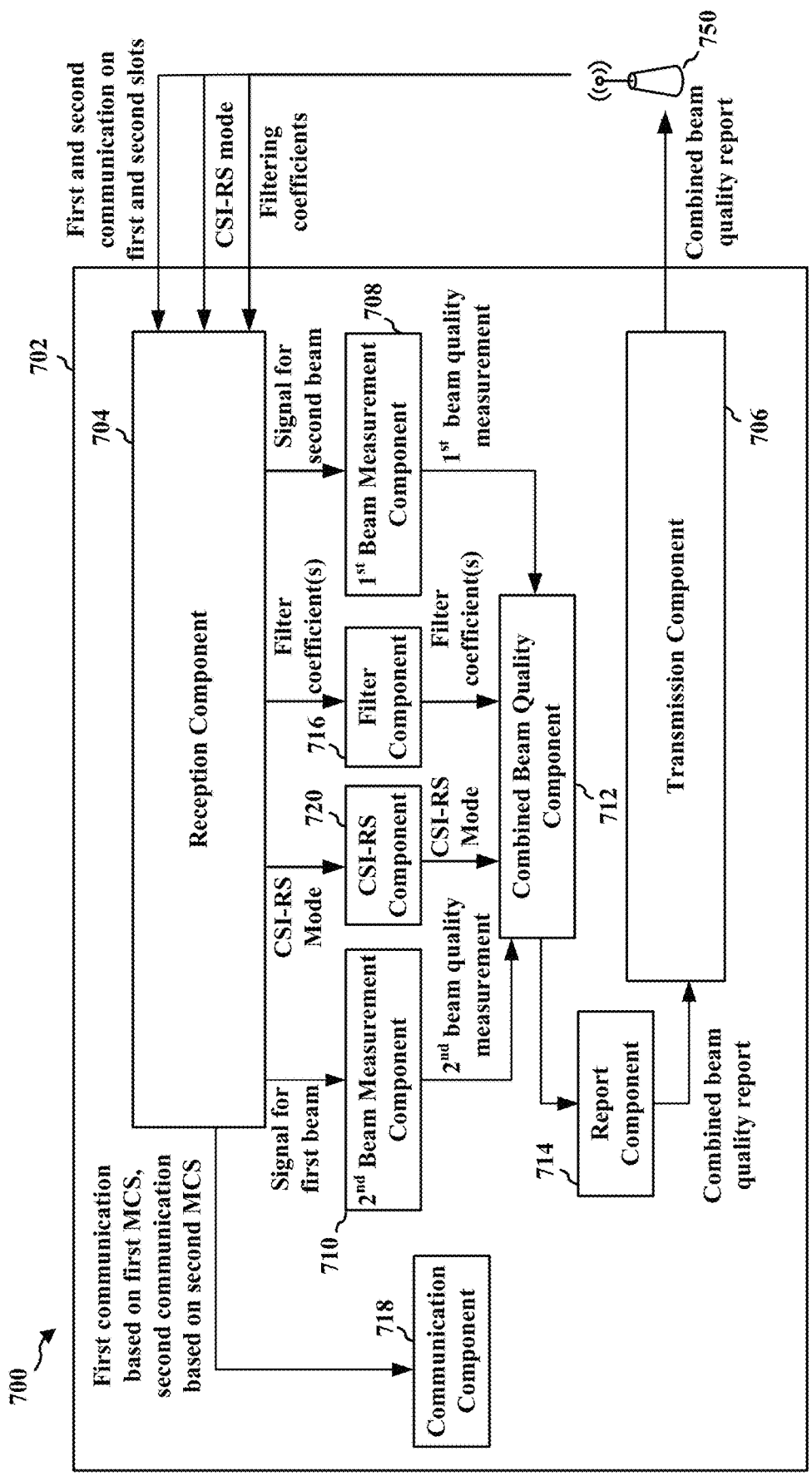
FIG. 7 is a conceptual data flow diagram illustrating the data flow between different means/components in an example apparatus.

FIG. 7 is a conceptual data flow diagram 700 illustrating the data flow between different modules/means/components in an example apparatus 702. The apparatus may be a UE (e.g., UE 104, 182, 350, 404, 502). The apparatus 702 includes a reception component 704 that receives downlink communication from base station 750 and a transmission component 706 that transmits uplink communication to base station 750. The communication between the apparatus and the base station may comprise mmW communication using transmission and reception beams. The apparatus includes a first beam measurement component 708 configured to perform a first beam quality measurement for a first beam associated with a first TCI state and a second beam measurement component 710 configured to perform a second beam quality measurement for a second beam associated with a second TCI state, wherein the first TCI state is different than the second TCI state. The measurements may be performed, as described in connection with FIGS. 5 and 6. The two measurements may be provided to a combined beam quality component 712 that is configured to determine a combined beam quality report for at least the first beam and the second beam. The combined beam quality measurement may be provided to a report component 714 configured to transmit the combined beam quality report to a base station, e.g., via the transmission component 706.

The apparatus may include a filter component 716 configured to receive a configuration of filtering coefficients from the base station, wherein the combined beam quality report comprises filtered CQI information for the first beam and the second beam. The apparatus may include a CSI-RS component 720 configured to receive a configuration of a CSI-RS mode for the combined beam quality report from the base station, wherein the combined beam quality report is based on the CSI-RS mode. The apparatus may include a communication component 718 configured to receive a first communication scheduled on a first slot or a first mini-slot based on a first MCS prior to the UE transmitting the combined beam quality report and to receive a second communication scheduled on a second slot or a second mini-slot based on a second MCS, wherein the second MCS is based on the combined beam quality report.

The apparatus may include additional components that perform each of the blocks of the algorithm in the aforementioned flowcharts of FIGS. 5 and 6. As such, each block in the aforementioned flowcharts of FIGS. 5 and 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
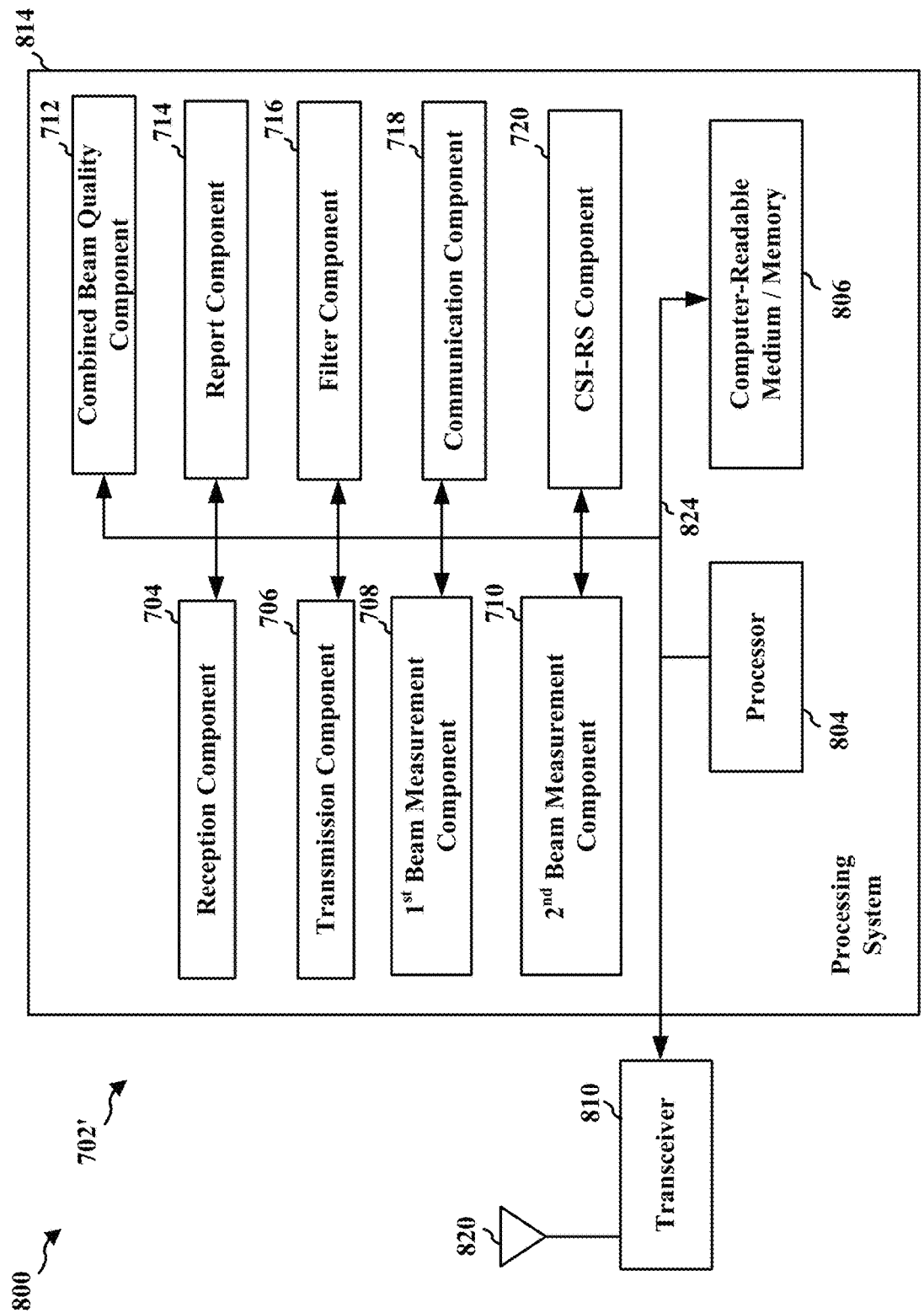
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, and 720. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for performing a first beam quality measurement for a first beam associated with a first Transmission Configuration Indicator (TCI) state; means for performing a second beam quality measurement for a second beam associated with a second TCI state, wherein the first TCI state is different than the second TCI state; means for determining a combined beam quality report for at least the first beam and the second beam; means for transmitting the combined beam quality report; means for receiving a configuration of filtering coefficients from the base station; means for receiving a configuration of a CSI-RS mode for the combined beam quality report from the base station; and means for receiving communication scheduled based on a first and second MCS. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
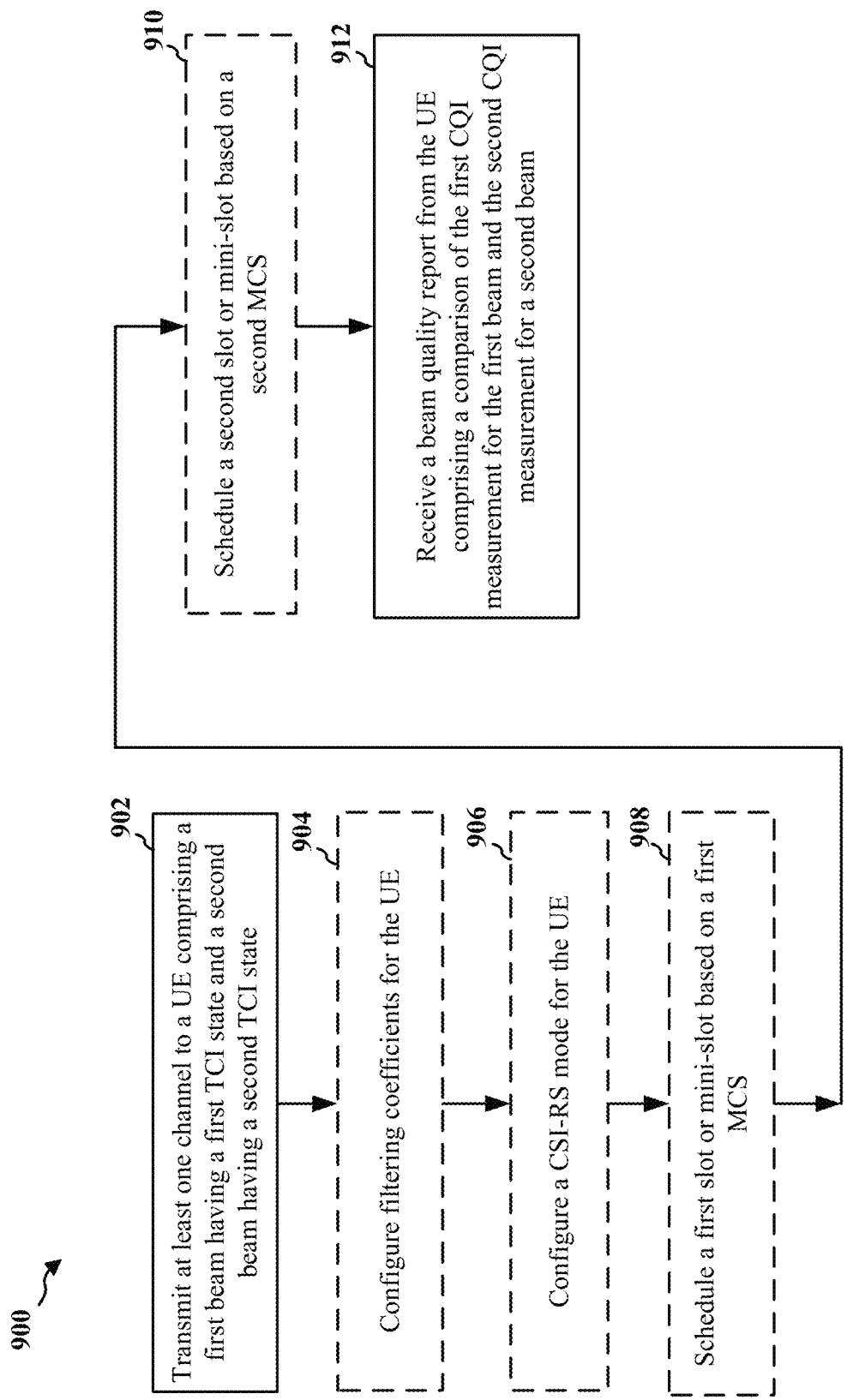
FIG. 9 is a flowchart of a method of wireless communication.

FIG. 9 is a flowchart 900 of a method of wireless communication. The method may be performed by a base station (e.g., base station 102, 180, 310, 402, 504, or apparatus 1002) communicating with a UE (e.g., UE 104, 182, 350, 404, 502, or the apparatus 702). The communication may be, e.g., mmW communication, and may include beamformed transmission and reception. Optional aspects are illustrated with a dashed line. The method described herein can provide a number of benefits, such as improving the ability of the UE and the base station to communicate using multiple beams and/or multiple TCI states.

At 902, the base station transmits at least one channel to a UE comprising multiple beams. Examples of beams that may be used to transmit the at least one channel are described in connection with 182' and 402a-402h. For instance, the two or more beams can comprise a first beam associated with a first TCI state and a second beam associated with a second, different TCI state. The channel may comprise a data channel, e.g., PDSCH, transmitted with multiple TCI states At 904, the base station can configure filtering coefficients for the UE. The base station may ask the UE to report the filtered CQI for the beams. This concept can be optimized for performance. For instance, one beam may have some performance loss when there is a great differential between the beams. A base station might configure filtering coefficients to determine how to perform a rate for each beam. Also, if a base station wants to use different slots for different beams, it can use filtering coefficients. In this manner, sub-band concepts can extend to beam concepts. Also, the combined beam quality report can comprise filtered CQI information for the first beam and the second beam.

At 906, the base station can configure a CSI-RS mode for the combined beam quality report from the UE. The base station might configure a CSI-RS mode to avoid multiple MCS specification. Different CSI-RS resources can have different QCL and requests for reports from the UE. The combined beam quality report received from the UE can also be based on the CSI-RS mode.

Based on the report from the UE, the base station can schedule a first MCS on a slot or mini-slot. Subsequent modulation order can be determined by both the base station and the UE based on feedback differential or delta CQI/RSRP, which can reduce DCI length. In some aspects, a base station can receive feedback regarding the strength of the beams. For example, the base station can use 64-Quadrature Amplitude Modulation (64-QAM) on the best beam, 16-QAM on a weaker beam, and Quadrature Phase Shift Keying (QPSK) on the weakest beam. In some aspects, if the differential or delta CQI/RSRP is less than a threshold, then the MCS can be reduced by a certain amount.

At 908, the base station can schedule a first slot or first mini-slot based on a first MCS. This scheduling of the first slot or first mini-slot can be done prior to receiving the combined beam quality report. In some aspects, an MCS for a subsequent slot/mini-slot may be determined by the UE and/or the base station based on a measurement during the first slot/mini-slot.

At 910, the base station can schedule a second slot or second mini-slot based on a second MCS, wherein the second MCS is based on the combined beam quality report. The combined beam quality report can comprise a comparison of the first CQI measurement and the second CQI measurement. Moreover, the second MCS can comprise a reduced MCS, for example, when the comparison of the first CQI measurement and the second CQI measurement is below a threshold.

At 912, the base station receives a combined beam quality report from the UE. This beam quality report can comprise a combination of a first beam quality measurement, such as a first CQI measurement, performed by the UE on the first beam and a second beam quality measurement, such as a second CQI measurement, performed by the UE on the second beam. The combined beam quality report may comprise a comparison of the first CQI measurement and the second CQI measurement. This comparison in the beam quality report may comprise a variety of different calculations, including a difference or delta, an average, a deviation, as well as any other analysis of the different CQI measurements. It is noted that the difference or delta calculation can be quantized using discrete values, rounding, truncation, etc.

The base station can use the information, measurements, and reports from the UE in a variety of manners. In one instance, the base station can use the reports from the UE to transmit the PDSCH over multiple beams and TCI states, as well as in a FDM or TDM manner. In some aspects, the MCS for FDM may be based on CSI using the same spatial domain filter. In other aspects, the MCS for TDM may be based on CSI using separate spatial domain filters.

In some aspects, if the base station sends the same PDSCH over multiple beams (e.g., four or eight beams), instead of sending an MCS for each beam, the UE can report the CQI for each beam. Additionally, the UE can report the delta or differential CSI for the multiple beams. The base station can follow the delta or differential based on what the UE reports. In addition, when communicating with the UE, the base station can use pre-coders. In certain transmission modes for certain channels (e.g., PUCCH or PDSCH), the base station can use different pre-coders. However, in other transmission modes, the base station can use the same pre-coder.

Figure 10:
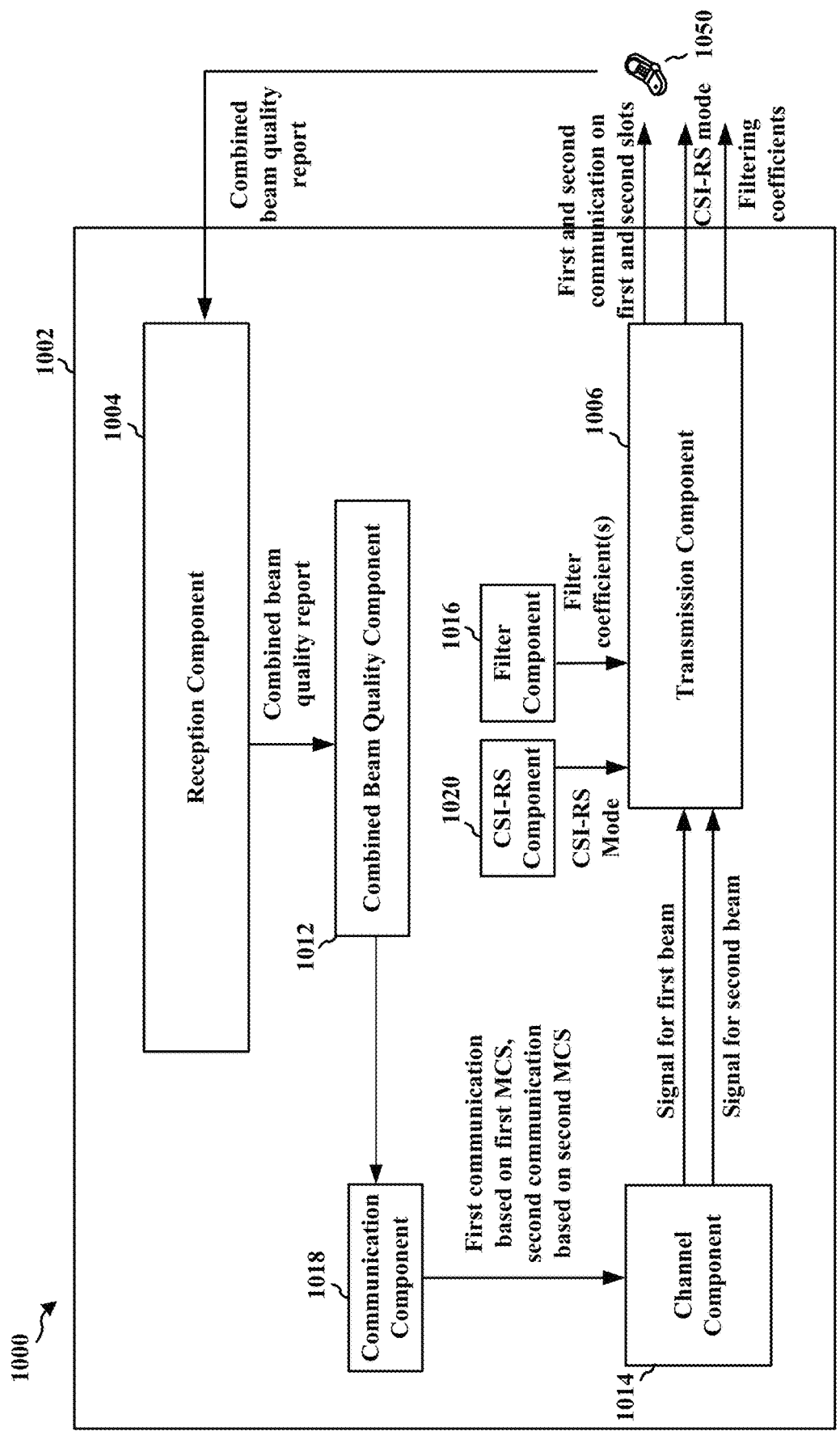
FIG. 10 is a conceptual data flow diagram illustrating the data flow between different means/components in an example apparatus.

FIG. 10 is a conceptual data flow diagram 1000 illustrating the data flow between different modules/means/components in an example apparatus 1002. The apparatus may be a base station (e.g., base station 102, 180, 310, 402, 504). The apparatus 1002 includes a reception component 1004 that receives uplink communication from UE 1050 and a transmission component 1006 that transmits downlink communication to UE 1050. The communication between the apparatus and the base station may comprise mmW communication using transmission and reception beams. The apparatus includes a channel component configured to transmit at least one channel to a UE 1050 comprising two or more beams, wherein the two or more beams comprise a first beam associated with a first TCI state and a second beam associated with a second TCI state, wherein the first TCI state is different than the second TCI state. The apparatus includes a combined beam quality component 1012 that is configured to receive a combined beam quality report from the UE for at least the first beam and the second beam. The combined beam quality report may be based on a combination of a first beam quality measurement performed by the UE on the first beam and a second beam quality measurement performed by the UE on the second beam. The combined beam quality measurement may be provided to a communication component 1018 configured to transmit communication to a UE, e.g., via the transmission component 1006.

The apparatus may include a filter component 1016 to configure filtering coefficients to send to the UE, wherein the combined beam quality report comprises filtered CQI information for the first beam and the second beam. The apparatus may include a CSI-RS component 1020 configured to configure a CSI-RS mode for the combined beam quality report from the UE, wherein the combined beam quality report received from the UE is based on the CSI-RS mode. The apparatus may include a communication component 1018 configured to schedule a first communication on a first slot or a first mini-slot based on a first MCS prior to the base station transmitting the first and second beams and to schedule a second communication on a second slot or a second mini-slot based on a second MCS, wherein the second MCS is based on the combined beam quality report.

The apparatus may include additional components that perform each of the blocks of the algorithm in the aforementioned flowcharts of FIGS. 5 and 9. As such, each block in the aforementioned flowcharts of FIGS. 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
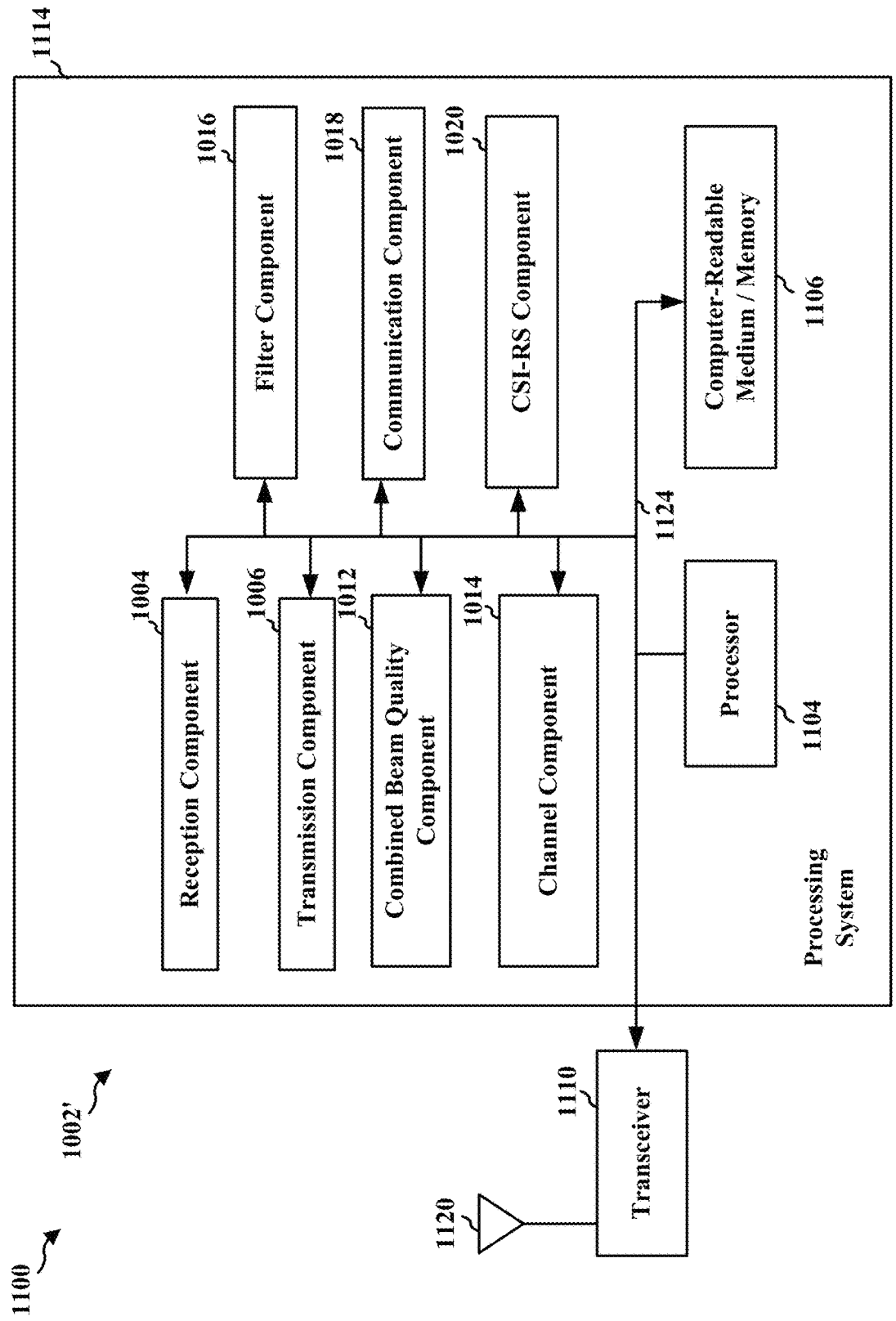
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1012, 1014, 1016, 1018, 1020, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1012, 1014, 1016, 1018, and 1020. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for wireless communication includes means for transmitting at least one channel to a UE comprising two or more beams, wherein the two or more beams comprise a first beam associated with a first TCI state and a second beam associated with a second TCI state, wherein the first TCI state is different than the second TCI state; means for receiving a combined beam quality report from the UE; means for configuring filtering coefficients for the UE; means for configuring a Channel State Information Reference Signal (CSI-RS) mode for the combined beam quality report from the UE; means for scheduling a first slot or a first mini-slot based on a first modulation and coding scheme (MCS) prior to receiving the combined beam quality report; and means for scheduling a second slot or a second mini-slot based on a second MCS, wherein the second MCS is based on the combined beam quality report. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) for transmitting a beam quality report, comprising:
    receiving, from a base station, a configuration of a Channel State Information Reference Signal (CSI-RS) mode;
    performing a first beam quality measurement for a first beam associated with a first Transmission Configuration Indicator (TCI) state;
    performing a second beam quality measurement for a second beam associated with a second TCI state, wherein the first TCI state is different than the second TCI state;
    determining a combined beam quality report including a value based upon at least the first beam quality measurement and the second beam quality measurement, wherein the CSI-RS mode indicates a type of report for the combined beam quality report and a quasi co-location (QCL) relationship between CSI-RS resources respectively associated with the first TCI state and the second TCI state, the second beam quality measurement uses a same spatial domain filter as the first beam quality measurement, and the type of report is associated with a channel quality indicator (CQI);
    determining to avoid calculating an average of the first beam quality measurement and the second beam quality measurement in the combined beam quality report based on a difference between the first beam and the second beam; and
    transmitting, to the base station, the combined beam quality report.

2. The method of claim 1, wherein the first beam quality measurement comprises a first CQI measurement and the second beam quality measurement comprises a second CQI measurement.

3. The method of claim 2, wherein the value of the combined beam quality report comprises a difference between the first CQI measurement and the second CQI measurement.

4. The method of claim 1, further comprising:
    receiving a first communication scheduled on a first slot or a first mini-slot based on a first modulation and coding scheme (MCS) prior to the UE transmitting the combined beam quality report; and
    receiving a second communication scheduled on a second slot or a second mini-slot based on a second MCS, wherein the second MCS is based on the combined beam quality report.

5. The method of claim 1, further comprising:
    receiving a configuration of filtering coefficients from the base station, wherein the combined beam quality report comprises filtered CQI information for the first beam and the second beam.

6. A method of wireless communication at a base station for receiving a beam quality report, comprising:
transmitting, to a user equipment (UE), at least one channel comprising two or more beams, wherein the two or more beams comprise a first beam associated with a first Transmission Configuration Indicator (TCI) state and a second beam associated with a second TCI state, wherein the first TCI state is different than the second TCI state;
transmitting, to the UE, a configuration of a Channel State Information Reference Signal (CSI-RS) mode; and
receiving, from the UE, a combined beam quality report, wherein the combined beam quality report includes a value based on a combination of a first beam quality measurement of the UE on the first beam and a second beam quality measurement of the UE on the second beam, wherein the CSI-RS mode indicates a type of report for the combined beam quality report and a quasi co-location (QCL) relationship between CSI-RS resources respectively associated with the first TCI state and the second TCI state, the second beam quality measurement is associated with a same spatial domain filter as the first beam quality measurement, and the type of report is associated with a channel quality indicator (CQI), wherein the combined beam quality report omits a calculation of an average of the first beam quality measurement and the second beam quality measurement based on a difference between the first beam and the second beam.

7. The method of claim 6, wherein the first beam quality measurement comprises a first CQI measurement for the first beam and the second beam quality measurement comprises a second CQI measurement for the second beam.

8. The method of claim 7, wherein the value of the combined beam quality report comprises a difference between the first CQI measurement and the second CQI measurement.

9. The method of claim 6, further comprising:
scheduling a first slot or a first mini-slot based on a first modulation and coding scheme (MCS) prior to receiving the combined beam quality report; and
scheduling a second slot or a second mini-slot based on a second MCS, wherein the second MCS is based on the combined beam quality report.

10. The method of claim 9, wherein the combined beam quality report comprises a difference between the first beam quality measurement and the second beam quality measurement, and wherein the second MCS comprises a reduced MCS when the difference between the first beam quality measurement and the second beam quality measurement is below a threshold.

11. The method of claim 6, further comprising:
configuring filtering coefficients for the UE, wherein the combined beam quality report comprises filtered CQI information for the first beam and the second beam.

12. An apparatus for wireless communication at a User Equipment (UE), comprising:
a memory; and
at least one processor coupled to the memory and configured to:
receive, from a base station, a configuration of a Channel State Information Reference Signal (CSI-RS) mode;
perform a first beam quality measurement for a first beam associated with a first Transmission Configuration Indicator (TCI) state;
perform a second beam quality measurement for a second beam associated with a second TCI state, wherein the first TCI state is different than the second TCI state;
determine a combined beam quality report including a value based on at least the first beam quality measurement and the second beam quality measurement, wherein the CSI-RS mode indicates a type of report for the combined beam quality report and a quasi co-location (QCL) relationship between CSI-RS resources respectively associated with the first TCI state and the second TCI state, the second beam quality measurement uses a same spatial domain filter as the first beam quality measurement, and the type of report is associated with a channel quality indicator (CQI);
determine to avoid calculating an average of the first beam quality measurement and the second beam quality measurement in the combined beam quality report based on a difference between the first beam and the second beam;
and
transmit, to the base station, the combined beam quality report.

13. The apparatus of claim 12, wherein the first beam quality measurement comprises a first CQI measurement and the second beam quality measurement comprises a second CQI measurement.

14. The apparatus of claim 13, wherein the value of the combined beam quality report comprises a difference between the first CQI measurement and the second CQI measurement.

15. The apparatus of claim 12, the at least one processor further configured to:
receive a first communication scheduled on a first slot or a first mini-slot based on a first modulation and coding scheme (MCS) prior to the UE transmitting the combined beam quality report; and
receive a second communication scheduled on a second slot or a second mini-slot based on a second MCS, wherein the second MCS is based on the combined beam quality report.

16. The apparatus of claim 12, the at least one processor further configured to:
receive a configuration of filtering coefficients from the base station, wherein the combined beam quality report comprises filtered CQI information for the first beam and the second beam.

17. An apparatus for wireless communication at a base station, comprising:
a memory; and
at least one processor coupled to the memory and configured to:
transmit, to a user equipment (UE), at least one channel comprising two or more beams, wherein the two or more beams comprise a first beam associated with a first Transmission Configuration Indicator (TCI) state and a second beam associated with a second TCI state, wherein the first TCI state is different than the second TCI state;
transmit, to the UE, a configuration of a Channel State Information Reference Signal (CSI-RS) mode; and
receive, from the UE, a combined beam quality report, wherein the combined beam quality report includes a value based on a combination of a first beam quality measurement of the UE on the first beam and a second beam quality measurement of the UE on the second beam, wherein the CSI-RS mode indicates a type of report for the combined beam quality report and a quasi co-location (QCL) relationship between CSI-RS resources respectively associated with the first TCI state and the second TCI state, the second beam quality measurement is associated with a same spatial domain filter as the first beam quality measurement, and the type of report is associated with a channel quality indicator (CQI), wherein the combined beam quality report omits a calculation of an average of the first beam quality measurement and the second beam quality measurement based on a difference between the first beam and the second beam.

18. The apparatus of claim 17, wherein the first beam quality measurement comprises a first CQI measurement and the second beam quality measurement comprises a second CQI measurement, wherein the value of the combined beam quality report comprises a difference between the first CQI measurement and the second CQI measurement.

19. The apparatus of claim 17, the at least one processor further configured to:
- schedule a first slot or a first mini-slot based on a first modulation and coding scheme (MCS) prior to receiving the combined beam quality report; and
- schedule a second slot or a second mini-slot based on a second MCS, wherein the second MCS is based on the combined beam quality report.

20. The apparatus of claim 17, the at least one processor further configured to:
- configure filtering coefficients for the UE, wherein the combined beam quality report comprises filtered CQI information for the first beam and the second beam.

\* \* \* \* \*